(12) United States Patent
Glauert (10) Patent No.: US 9,703,604 B2
(45) Date of Patent: Jul. 11, 2017

(54) CONFIGURABLE THREAD ORDERING FOR THROUGHPUT COMPUTING DEVICES

(71) Applicant: ARM Limited, Cambridge (GB)

(72) Inventor: Timothy Holroyd Glauert, Cambridge (GB)

(73) Assignee: ARM Limited, Cambridge (GB)

( * ) Notice: Subject to any disclaimer, the term of this patent is extended or adjusted under 35 U.S.C. 154(b) by 38 days.

(21) Appl. No.: 14/557,935

(22) Filed: Dec. 2, 2014

(65) Prior Publication Data
US 2015/0160982 A1 Jun. 11, 2015

(30) Foreign Application Priority Data
Dec. 10, 2013 (GB) .................................. 1321831.8

(51) Int. Cl.
G06F 9/46 (2006.01)
G06F 9/50 (2006.01)
G06F 9/30 (2006.01)
G06F 9/48 (2006.01)

(52) U.S. Cl.
CPC .......... *G06F 9/5016* (2013.01); *G06F 9/3009* (2013.01); *G06F 9/4881* (2013.01); *G06F 9/5027* (2013.01)

(58) Field of Classification Search
None
See application file for complete search history.

(56) References Cited

U.S. PATENT DOCUMENTS

| 4,318,173 | A | * | 3/1982 | Freedman | G06F 9/4881 714/48 |
| 4,333,144 | A | * | 6/1982 | Whiteside | G06F 9/4881 718/102 |
| 5,724,586 | A | * | 3/1998 | Edler | G06F 9/4881 718/102 |
| 6,341,338 | B1 | * | 1/2002 | Dennie | G06F 9/5016 711/147 |
| 6,542,921 | B1 | | 4/2003 | Sager | |
| 6,725,455 | B2 | * | 4/2004 | Staiger | G06F 9/505 709/203 |

(Continued)

OTHER PUBLICATIONS

GB Search Report for GB Application No. 1321831.8, dated May 28, 2014, Mr. Nigel Hanley, 3 pages.

(Continued)

*Primary Examiner* — Tuan Q. Dam
*Assistant Examiner* — Zheng Wei
(74) *Attorney, Agent, or Firm* — Nixon & Vanderhye P.C.

(57) ABSTRACT

A data processing apparatus and method processing data are disclosed. Execution circuitry is configured to execute multiple threads to perform data processing on input data by reference to at least one coordinate value of points in a reference domain. Thread allocation circuitry is configured to specify a selected point in the reference domain for each thread of the multiple threads respectively in order to allocate the data processing by specifying for each thread the at least one coordinate value of the specified point for that thread. Each thread accesses the input data with reference to its selected point in the reference domain and an order in which points in the reference domain are allocated to threads for data processing is configurable in the thread allocation circuitry.

20 Claims, 8 Drawing Sheets

(56) References Cited

U.S. PATENT DOCUMENTS

| | | | | |
|---|---|---|---|---|
| 7,296,270 B2* | 11/2007 | Wetzel | ............... | G06F 9/4881 700/17 |
| 7,310,722 B2 | 12/2007 | Moy | | |
| 7,337,443 B2* | 2/2008 | Welland | ............... | G06F 9/4881 712/26 |
| 7,366,878 B1 | 4/2008 | Mills | | |
| 7,401,335 B2* | 7/2008 | Pizzi | ............... | G06F 9/5016 718/100 |
| 7,441,101 B1* | 10/2008 | Steiss | ............... | G06F 9/3802 712/205 |
| 7,659,898 B2* | 2/2010 | Prokopenko | ............... | G06F 9/5044 345/504 |
| 7,659,899 B2* | 2/2010 | Paltashev | ............... | G06F 9/3836 345/505 |
| 7,853,950 B2 | 12/2010 | Lewis | | |
| 7,941,645 B1* | 5/2011 | Riach | ............... | G06T 1/20 712/220 |
| 8,166,237 B1* | 4/2012 | Atsatt | ............... | G11C 7/00 711/105 |
| 8,373,716 B2 | 2/2013 | Bronstein et al. | | |
| 8,566,647 B2* | 10/2013 | Maybee | ............... | G06F 11/323 714/38.1 |
| 9,170,843 B2* | 10/2015 | Glew | ............... | G06F 9/5011 |
| 9,189,242 B2 | 11/2015 | Lindholm | | |
| 9,286,262 B2* | 3/2016 | Lippett | ............... | G06F 15/80 |
| 9,507,637 B1* | 11/2016 | Saville, III | ............... | G06F 9/5016 |
| 2002/0099757 A1* | 7/2002 | Wetzel | ............... | G06F 9/4881 718/102 |
| 2003/0177162 A1* | 9/2003 | Staiger | ............... | G06F 9/505 718/102 |
| 2004/0015684 A1* | 1/2004 | Peterson | ............... | G06F 9/4843 712/245 |
| 2004/0019746 A1 | 1/2004 | Sager | | |
| 2004/0177165 A1* | 9/2004 | Masputra | ............... | G06F 9/5033 709/250 |
| 2005/0149936 A1* | 7/2005 | Pilkington | ............... | G06F 9/3851 718/102 |
| 2005/0237329 A1 | 10/2005 | Rubinstein | | |
| 2006/0059485 A1* | 3/2006 | Onufryk | ............... | G06F 9/4881 718/100 |
| 2006/0123420 A1* | 6/2006 | Nishikawa | ............... | G06F 9/5066 718/104 |
| 2006/0161924 A1* | 7/2006 | Di Gregorio | ............... | G06F 9/30101 718/107 |
| 2007/0030278 A1* | 2/2007 | Prokopenko | ............... | G06F 9/5044 345/506 |
| 2007/0030279 A1* | 2/2007 | Paltashev | ............... | G06F 9/3836 345/506 |
| 2007/0030280 A1* | 2/2007 | Paltashev | ............... | G06T 1/20 345/506 |
| 2007/0113053 A1 | 5/2007 | Jensen | | |
| 2007/0124733 A1* | 5/2007 | Bril | ............... | G06F 9/4881 718/104 |
| 2007/0159488 A1 | 7/2007 | Danskin et al. | | |
| 2007/0169125 A1* | 7/2007 | Qin | ............... | G06F 9/4881 718/102 |
| 2007/0226739 A1* | 9/2007 | Dodge | ............... | G06F 9/4881 718/102 |
| 2007/0266387 A1* | 11/2007 | Henmi | ............... | G06F 9/4843 718/102 |
| 2009/0138683 A1* | 5/2009 | Capps, Jr. | ............... | G06F 9/30101 712/220 |
| 2009/0307698 A1 | 12/2009 | Khatri | | |
| 2010/0082944 A1 | 4/2010 | Adachi et al. | | |
| 2010/0082945 A1* | 4/2010 | Adachi | ............... | G06F 9/3851 712/200 |
| 2010/0100708 A1* | 4/2010 | Ukai | ............... | G06F 9/3851 712/205 |
| 2011/0050713 A1 | 3/2011 | McCrary | | |
| 2011/0055479 A1 | 3/2011 | West | | |
| 2011/0072244 A1 | 3/2011 | Lindholm et al. | | |
| 2011/0072438 A1* | 3/2011 | Fiyak | ............... | G06F 9/3009 718/104 |
| 2011/0078226 A1 | 3/2011 | Baskaran et al. | | |
| 2012/0023505 A1* | 1/2012 | Shin | ............... | G06F 9/526 718/108 |
| 2012/0089812 A1* | 4/2012 | Smith | ............... | G06F 9/4843 712/21 |
| 2012/0159261 A1* | 6/2012 | Maybee | ............... | G06F 11/362 714/38.13 |
| 2013/0024867 A1* | 1/2013 | Glew | ............... | G06F 9/4881 718/104 |
| 2013/0160023 A1* | 6/2013 | Suzuki | ............... | G06F 9/4887 718/104 |
| 2013/0254592 A1* | 9/2013 | Yamada | ............... | G06F 11/1492 714/10 |
| 2014/0025857 A1* | 1/2014 | Lippett | ............... | G06F 9/4812 710/267 |
| 2014/0026141 A1* | 1/2014 | Lippett | ............... | G06F 9/4812 718/104 |
| 2014/0109098 A1* | 4/2014 | Sato | ............... | G06F 9/3836 718/102 |
| 2014/0189698 A1 | 7/2014 | Choquette | | |
| 2014/0237474 A1* | 8/2014 | Branton | ............... | G06F 9/4881 718/102 |

OTHER PUBLICATIONS

Edelman, Alan et al., "Index Transformation Algorithms in a Linear Albegra Framework", IEEE Transactions on Parallel and Distributed Systems, vol. 5, No. 12, (Dec. 1994), pp. 1302-1309.

Jog, Adwait et al., "Orchestrated Scheduling and Prefetching for GPGPUs", ISCA '13, (May 6, 2013), 12 pages.

Mackerras, P. et al., "Index Bit Permutations for Automatic Data Redistribution", IEEE, (1997), pp. 23-30.

Shao, J. et al., "The Bit-reversal SDRAM Address Mapping", SCOPES '05, (Sep. 29-Oct. 1, 2005, pp. 62-71.

Sung, I-J et al., "Data Layout Transformation Exploiting Memory-Level Parallelism in Structured Grid Many-Core Applications", PACT' 10, (Sep. 11-15, 2010), pp. 513-522.

Office Action mailed Mar. 11, 2016 in co-pending U.S. Appl. No. 14/557,881, 20 pages.

International Search Report for PCT/GB2014/053418 dated Jan. 28, 2015, six (6) pages.

Written Opinion of the ISA for PCT/GB2014/053418 dated Jan. 28, 2015, seven (7) pages.

Henry Wong et al., "Demystifying GPU Microarchitecture through Microbenchmarking", *Performance Analysis of Systems & Software (ISPASS)*, Mar. 28, 2010, pp. 235-246.

U.S. Appl. No. 14/557,881, filed Dec. 2, 2014, Nugteren et al.

Search Report for GB 1321841.7 dated May 30, 2014, three pages.

Bakhoda et al., "Analyzing CUDA Workloads Using a Detailed GPU Simulator", *University of British Columbia*, 2009, 12 pages.

Ding et al., "Predicting Whole-Program Loyalty through Reuse Distance Analysis", *PLDI '03*, Jun. 9-11, 2003, pp. 245-257.

Fuller et al., "Computer Performance: Game Over or Next Level?" *IEEE*, Jan. 2011, pp. 31-38.

Gebhart et al., "A Hierarchical Thread Scheduler and Register File for Energy-Efficient Throughput Processors", *ACM Transactions on Computer Systems*, vol. 30, No. 2, Article 8, Apr. 2012, 38 pgs.

Jog et al., "OWL: Cooperative Thread Array Aware Scheduling Techniques for Improving GPGPU Performance", *ASPLOS '13*, Mar. 16-20, 2013, pp. 1-12.

Kayiran et al., "Neither More Nor Less: Optimizing Thread-level Parallelism for GPGPUs", *Technical Report CSE-12-006*, Sep. 2012, 13 pages.

I. Kontaxakis, "Contribution to Image Segmentation and Integral Image Coding", *National and Kapodistrian Univ. of Athens*, 2008, 10 pages.

Lashgar et al., "Dynamic Warp Resizing: Analysis and Benefits in High-Performance SIMT", Sep. 2012, 2 pages.

Meng et al., "Dynamic Warp Subdivision for Integrated Branch and Memory Divergence Tolerance", *ISCA '10*, Jun. 19-23, 2010, 12 pages.

(56) References Cited

OTHER PUBLICATIONS

Narasiman et al., "Improving GPU Performance via Large Warps and Two-Level Warp Scheduling", *MICRO '11*, Dec. 3-7, 2011, 10 pages.
Philbin et al., "Thread Scheduling for Cache Locality", *ASPLOS VII*, Oct. 1996, pp. 60-71.
Rogers et al., "Cache-Conscious Wavefront Scheduling", *Univ. of British Columbia / Advanced Micro Devices, Inc.*, Dec. 2012, 12 pages.
Stratton et al., "Optimization and Architecture Effects on GPU Computing Workload Performance", *University of Illinois*, 2012, 10 pages.
Tam et al., "Thread Clustering: Sharing-Aware Scheduling on SMP-CMP-SMT Multiprocessors", *EUROSYS '07*, Mar. 21-23, 2007, pp. 47-58.
Thekath et al., "Impact of Sharing-Based Thread Placement on Multithreaded Architectures", *University of Washington, Dept. of Computer Science and Eng., FR-35*, 1994, pp. 1-15.
Final Office Action mailed Sep. 29, 2016 in co-pending U.S. Appl. No. 14/557,881, 18 pages.
Office Action mailed Jan. 17, 2017 in co-pending U.S. Appl. No. 14/557,881, 19 pages.

\* cited by examiner

Domain is 8x4
Inner sub-domain is 2x2
Outer sub-domain is 4x4
Numbers give the order in which points in the domain are assigned to threads Outer Depth First    Inner Depth First

| 0  1  | 4  5  | | 16 17 | 20 21 |
| 2  3  | 6  7  | | 18 19 | 22 23 |

| 8  9  | 12 13 | | 24 25 | 28 29 |
| 10 11 | 14 15 | | 26 27 | 30 31 |

Outer Depth First    Inner Breadth First

| 0  4  | 1  5  | | 16 20 | 17 21 |
| 8  12 | 9  13 | | 24 28 | 25 29 |

| 2  6  | 3  7  | | 18 22 | 19 23 |
| 10 14 | 11 15 | | 26 30 | 27 31 |

Outer Breadth First    Inner Depth First

| 0  2  | 8  10 | | 1  3  | 9  11 |
| 4  6  | 12 14 | | 5  7  | 13 15 |

| 16 18 | 24 26 | | 17 19 | 25 27 |
| 20 22 | 28 30 | | 21 23 | 29 31 |

Outer Breadth First    Inner Breadth First

| 0  8  | 2  10 | | 1  9  | 3  11 |
| 16 24 | 18 26 | | 17 25 | 19 27 |

| 4  12 | 6  14 | | 5  13 | 7  15 |
| 20 28 | 22 30 | | 21 29 | 23 31 |

FIG. 4B

PROGRAM INSTRUCTIONS:
~~~~~~~~~~~~~~~~
~~~~~~~~~~~~~~~~
DEFINE REFDOMAIN (1000,800)
DEFINE HIERARCHYLEVELS = 2
DEFINE LEVEL 0,2,2
DEFINE LEVEL 1,3,3
DEFINE ORDERING LEVEL 0, DEPTH
DEFINE ORDERING LEVEL 1, BREADTH
DEFINE ORDERING [BASE], RASTER

FIG. 5A

PROGRAM INSTRUCTIONS:
~~~~~~~~~~~~~~~~
~~~~~~~~~~~~~~~~
~~~~~~~~~~~~~~~~
~~~~~~~~~~~~~~~~
DEFINE ORDERING LEVEL 0, [FUNCTION]
DEFINE ORDERING LEVEL 1, [HARDWARE]
DEFINE POINT USAGE, ALTERNATE

FIG. 5B

PROGRAM INSTRUCTIONS:
→ [KERNEL]
→ [REFERENCE DOMAIN]
→ [ORDERING]

CONFIGURABLE THREAD ORDERING FOR THROUGHPUT COMPUTING DEVICES

This application claims priority to GB Application No. 1321831.8, filed on Dec. 10, 2013, the entire content of which is incorporated by reference.

The present invention relates to the field of data processing. More particularly, it relates to the allocation of data processing tasks to the multiple threads executing in a data processing apparatus.

BACKGROUND

It is known for a contemporary data processing apparatus such as a graphics processing unit (GPU) to be programmed in a single program multiple data (SPMD) fashion in which the programmer provides a single program (or kernel) and a set of multiple data items on which that single program should operate. The data processing apparatus then creates and executes a thread for each data item within that data set. For example, in the context of image processing on a GPU, a thread can be created and executed for each pixel in a frame, with many threads being executed simultaneously in order to perform the same data processing operation on each pixel within the frame.

It is further known that a data processing apparatus such a GPU may benefit, in terms of data processing efficiency, if the order in which data values are processed is adapted to benefit the configuration of the data processing apparatus. For example, advantages related to cache locality can result if the data values are processed in an order which is modified in dependence on the requirements of the image processing to be performed. For example, it is known that where an image processing operation requires a comparison of data values related to one image pixel to be compared to its immediate neighbours, a block-wise approach to processing the pixels in the image is likely to result in improved cache performance with respect to an approach in which the pixels are handled in a row-by-row raster order configuration.

Programming models such as CUDA and OpenCL allow such a deviation from raster-scan processing of pixel data by grouping threads together, e.g. in blocks, in order to more efficiently make use of architectural features such as local memory and barriers.

In order to adapt the order in which the pixels in an image frame are processed, it is known for the kernel running in each thread to adapt its address calculation from a simple linear increment to a calculation which allows, for example, the above mentioned block-wise treatment of the pixels to result.

In a massively-parallel data processing apparatus such a GPU, it is however advantageous to reduce the processing that must be performed by each kernel running within each thread as much as possible in order to allow the data processing apparatus as a whole to more effectively process large volumes of input data.

Accordingly, it would be advantageous to enable a data processing apparatus to improve its data processing performance by adapting the order in which a set of data items are processed, without increasing the processing burden on each kernel running within each thread of that parallel data processing device.

SUMMARY

Viewed from a first aspect, the present techniques provide a data processing apparatus configured to perform data processing in a single program multiple data fashion, the data processing apparatus comprising: execution circuitry configured to execute multiple threads to perform the data processing on input data by reference to at least one coordinate value of points in a reference domain; and thread allocation circuitry configured to specify a selected point in the reference domain for each thread of the multiple threads respectively in order to allocate the data processing by specifying for each thread the at least one coordinate value of the specified point for that thread, wherein each thread accesses the input data with reference to its selected point in the reference domain, and wherein an order in which points in the reference domain are allocated to threads for data processing is configurable in the thread allocation circuitry.

Viewed from a second aspect the present techniques provide a data processing apparatus configured to perform data processing in a single program multiple data fashion, the data processing apparatus comprising:

means for executing multiple threads to perform the data processing on input data by reference to at least one coordinate value of points in a reference domain; and means for specifying a selected point in the reference domain for each thread of the multiple threads respectively in order to allocate the data processing by specifying for each thread the at least one coordinate value of the specified point for that thread, wherein each thread accesses the input data with reference to its selected point in the reference domain, and wherein an order in which points in the reference domain are allocated to threads for data processing is configurable in the means for specifying.

Viewed from a third aspect the present techniques provide a method of data processing in a single program multiple data fashion, the method of data processing comprising the steps of:

executing multiple threads to perform the data processing on input data by reference to at least one coordinate value of points in a reference domain; and specifying a selected point in the reference domain for each thread of the multiple threads respectively in order to allocate the data processing by specifying for each thread the at least one coordinate value of the specified point for that thread, wherein each thread accesses the input data with reference to its selected point in the reference domain, and wherein an order in which points in the reference domain are allocated to threads for data processing is configurable in the specifying step.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

The data processing apparatus is a single program multiple data device, meaning that the programmer provides only a single program (i.e. sequence of instructions) and indicates the input data on which that single program should operate. The device is then configured to execute that single program in a parallel fashion across multiple data items simultaneously in the set of input data. To do this, the data processing apparatus is provided with execution circuitry which is configured to execute multiple threads. Each thread of those multiple threads then seeks to perform essentially the same data processing operations (subject to conditional branches which that particular thread may take) on an input data value which has been allocated to it. According to the present techniques the execution circuitry determines the input data value on which it should perform its processing with respect to a reference domain. The reference domain sets out a range of points and each point thus represents an individual "processing point" which a thread can use as its reference when determining which input data to process. Each point in the reference domain can be identified by at least one coordinate value, for example, where the reference domain is n-dimensional, a given point within that domain can be referenced by n coordinate values.

The data processing apparatus is provided with thread allocation circuitry which determines the input data for each thread to be executed in the execution circuitry (note that this could be a single data input data value per thread or it could be plural data input values per thread) and this is done by means of the at least one coordinate value by which the points in the reference domain are identified. The thread allocation circuitry does not however simply allocate input data to threads in a sequential fashion in which a point with the next sequential coordinate value is allocated to the next available thread, but rather the order in which those points are allocated to threads for data processing is configurable in the thread allocation circuitry. The configurability of this order thus enables the thread allocation circuitry to adapt the ordering in dependence on the particular requirements of the data processing apparatus and/or the particular kernel being executed. Prior art approaches (such as those of CUDA and OpenCL) of merely grouping threads together have been found to leave room for improvement with respect to system/kernel performance. In particular, enabling the ordering to be configurable in the manner of the present techniques has been found to enable a particularly flexible approach to making improvements both in terms of the efficient usage of various architectural components of the data processing apparatus and in terms of optimizing the performance of a particular kernel.

The execution circuitry could comprise just a single execution unit (for example just a single processor core) but in one embodiment the data processing apparatus comprises a plurality of execution units. This further increases the parallelism which can be achieved by the apparatus, in that the multiple threads are executed across multiple execution units.

The thread allocation circuitry could be provided in a number of different ways in the data processing apparatus. For example, in one embodiment the data processing apparatus further comprises job manager circuitry configured to allocate the data processing between the plurality of execution units, and the thread allocation circuitry is provided by the job manager circuitry. In such a "multi-core" system, having a plurality of execution units, the job manager circuitry is provided to subdivide the data processing operations which must be carried out by the data processing as a whole between the execution units of the data processing apparatus, for example on the basis of availability and capacity. The allocation of points in the reference domain to threads can therefore in such an embodiment be effected by the job allocation performed by the job manager circuitry and it can therefore be at this level of the job allocation that the configuration of the order in which the points in the reference domain are allocated to threads is effected. For example, the job manager circuitry can group the points together such that the input data values on which a given execution unit will perform its data processing will exhibit a locality, which may for example improve the usage of a cache within that execution unit.

Alternatively or in addition, the thread allocation circuitry can be provided by thread dispatch circuitry associated with the execution circuitry. Each execution unit can thus have its own thread dispatch unit which allocates the data processing tasks to be performed by that execution unit to the multiple threads which execute within that execution unit. It can therefore be at this level of the thread dispatching that the configuration of the order in which the points in the reference domain are allocated to threads is effected.

In some embodiments the order in which points in the reference domain are allocated to threads is configurable at more than one level of granularity. For example, this means that the ordering of points may be varied on the one hand at a fine level of granularity—say switching the ordering of individual adjacent points—and can simultaneously be varied at a coarser level of granularity—say switching the ordering of groups of points. Simultaneous ordering variation at more than two levels of granularity is further envisaged.

The order in which points in the reference domain are allocated may be varied in a number of ways. In one embodiment the thread allocation circuitry is configured to sub-divide the reference domain into a plurality of sub-domains and the thread allocation circuitry is configured to allocate all points within a first sub-domain to threads for data processing before allocating points within a second sub-domain to threads for data processing, such that the order in which points are allocated to threads is not a raster scan order through the reference domain. This sub-division of the reference domain into a plurality of sub-domains thus provides one approach by which the order in which points are allocated to threads for data processing is not a raster scan (i.e. sequential) order through the reference domain. For example with respect to a two dimensional reference domain the thread allocation circuitry may sub-divide that two dimensional domain into a number of smaller blocks, and by allocating points to threads for data processing based on a chosen block ordering, the processing order of the points can be varied from raster scan order.

In one such embodiment, the thread allocation circuitry is configured to sub-divide the reference domain into a hierarchy of sub-domains, wherein the hierarchy comprises at least two levels and wherein the thread allocation circuitry is configured to allocate points to threads in an iterative, nested fashion with respect to the hierarchy. The order in which the thread allocation circuitry approaches the nested nature of the levels of the hierarchy can be chosen in dependence on the particular system and/or kernel requirements. For example, it may be advantageous to proceed in a depth first approach with respect to the hierarchy, such that points at the lowest level of the hierarchy are sequentially processed (e.g. in a raster scan ordering), meaning that overall the points are processed in an order which retains some degree of the original locality of the (sequential) set of points. Alternatively, the thread allocation circuitry may approach the hierarchy of sub-domains in a breadth first manner, meaning that after a given point at a lowest level of the hierarchy has been processed, the data processing then "jumps" to a new point generated by iterating a sub-domain at a higher level of the hierarchy. This may, for example, be advantageous if it is desirable to process the points in a manner that introduces a degree of non-locality (and the degree of this non-locality can then be configured by the choice of sub-domain size). For example, where the data processing apparatus seeks to hide memory access latency by making use of a pending memory transaction queue, the overall performance of the data processing system may be improved if that queue is kept relatively full, and this breadth first approach to hierarchy of sub-spaces is one way of achieving this.

When the thread allocation circuitry is configured to sub-divide the space into a hierarchy of sub-spaces, it may be provided that the system user (i.e. the programmer) can at least partially determine how that hierarchy is treated by the thread allocation circuitry. Accordingly, in one embodiment the data processing apparatus is configured such that a program instruction executed by the data processing apparatus can specify at least one level of the hierarchy at which the order in which points are allocated to threads is to be determined by the thread allocation circuitry. The user can therefore configure the processing order of the points by for example specifying a chosen level of the hierarchy at which the thread allocation circuitry should determine the order in which points are to be allocated to threads, whilst explicitly specifying the ordering with respect to another level of the hierarchy.

In some situations the user may desire more direct control over the configurable ordering and hence in one embodiment the data processing apparatus is configured such that a program instruction executed by the data processing apparatus can specify at least partially the order in which points are allocated to threads.

This more direct control over the order may apply universally, or in accordance with one embodiment the data processing apparatus can be configured such that a program instruction executed by the data processing apparatus can specify at least partially the order in which points are allocated to threads for at least one level of the hierarchy. It may for example be the case that the definition of one level of the hierarchy is particularly significant for system performance, and the user may therefore wish to take full control over this level, but conversely may allow the order at other levels to be freely determined by the apparatus. For example, at a given level of the hierarchy the user may choose to specify that either a breadth first approach or a depth first approach should be taken to the allocation order of the points within that level of the hierarchy.

When the reference domain is sub-divided into a hierarchy of sub-spaces, it may be provided that the system user (i.e. the programmer) can specify the order in which the levels are treated by the thread allocation circuitry. Accordingly in some embodiments the data processing apparatus is configured such that a program instruction executed by the data processing apparatus can specify an order in which the at least two levels of the hierarchy are to be used to allocate points to threads. For example, where the reference domain is subdivided into outer and inner sub-domains, the user can specify whether the allocation should iterate over the outer or the inner sub-domain first.

There is a range of architectural features of the data processing apparatus which could be taken into consideration when the order in which points are allocated to threads for data processing is configured. In some embodiments the at least one execution circuitry is warp-based execution circuitry and the order in which points are allocated to threads for data processing is configured in dependence on a number of threads in a warp used by the warp-based execution circuitry. The coordinated execution of threads in warp based execution circuitry may benefit from an order of points allocation which is configured to match, for example because of the closely related (in terms of memory addresses) load and store operations which may then result, and the more efficient coordinated memory access which can then be performed.

In some embodiments the data processing apparatus further comprises at least one cache storage configured to store temporary copies of data retrieved from memory, wherein the order in which points are allocated to threads is configured in dependence on a size of the cache. More efficient use of the cache can for example result if the points are allocated to threads such that the resulting data processing seeks to populate the cache with related data items that occupy one cache line and not with too many unrelated data items which would then result in thrashing in the cache. In some embodiments comprising at least one cache storage configured to store temporary copies of data retrieved from memory, the order in which points are allocated to threads is configured in dependence on a re-use distance of the cache. In other words the frequency with which selected data items in the cache are (re)accessed by the particular kernel being executed may be chosen as a metric for determining the ordering in which the points are allocated.

In some embodiments the data processing apparatus comprises an outstanding transaction queue configured to hold indications of pending memory transactions resulting from the data processing, wherein the order in which points are allocated to threads is configured in dependence on a size of the outstanding transaction queue. For example, the data processing apparatus may operate most efficiently if the outstanding transaction queue is kept relatively full, since this can hide the latency associated with each individual memory transaction. The order in which points are allocated to threads can facilitate keeping the queue full by virtue of the corresponding memory addresses which must be accessed for each point.

An empirical approach to configuring the order in which points are allocated may be taken and in one embodiment the data processing apparatus further comprises optimisation circuitry configured to configure the order in which coordinate values are allocated to threads for data processing on the basis of previous data processing performance. This may be done to optimise various performance parameters, such as data processing time and/or data processing energy consumption.

A predictive approach to configuring the order in which points are allocated may also be taken and in one embodiment the data processing apparatus further comprises optimisation circuitry configured to configure the order in which points are allocated to threads on the basis of at least one architectural parameter of the data processing apparatus. As such, by knowing how the data processing apparatus is set up, steps may already be taken to improve system performance. For example, this could be to vary the ordering in dependence on one of the architectural parameters mentioned above, where this architectural parameter is known to the optimisation circuitry.

The manner in which the order of allocation of the points is configured in the thread allocation circuitry could take a number of forms. For example, in one embodiment the thread allocation circuitry is configured to determine the order in which points are allocated to threads as a function of a thread number of each of the threads. This function may for example be determined by a program instruction executed by the data processing apparatus. In other words the user could directly specify this function which converts thread numbers into points in the reference domain. The function could for example permute at least a portion of the thread number of each of the threads.

It may be the case that it is not required (or even desired) that all points in the reference domain are allocated to threads for processing and in some embodiments the data processing apparatus is configured such that a program instruction executed by the data processing apparatus can specify a subset of the points in the reference domain which are to be allocated to threads for processing by the thread allocation circuitry.

Figure 1:
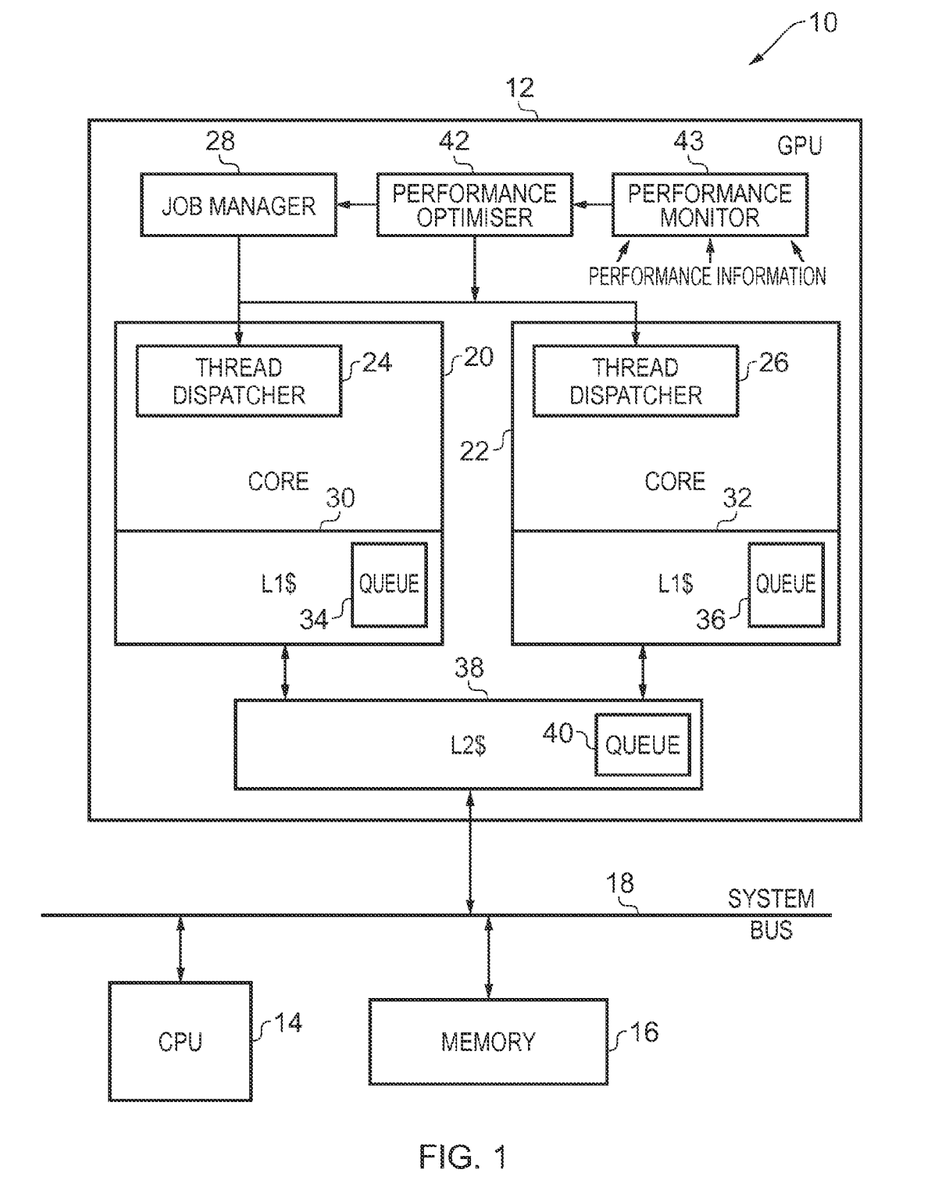
FIG. 1 schematically illustrates a multi-core GPU to which a CPU delegates data processing tasks in one embodiment.

FIG. 1 schematically illustrates a data processing apparatus 10 in one embodiment. This data processing apparatus 10 comprises a graphics processing unit (GPU) 12, a central processing unit (CPU) 14 and a memory 16 coupled together via a system bus 18. Overall control of the data processing apparatus 10 is maintained by the CPU 14 which executes a sequence of program instructions (for example retrieved from the memory 16) defining its data processing operations. The GPU 12 is provided as a dedicated hardware device to which the CPU 14 can delegate various data processing tasks. In particular, the GPU 12 is configured to be particularly well suited to highly parallelised data processing operations, for example as may be commonly be required in association with graphics processing. Moreover, the GPU 12 is configured to be programmed using a single program multiple data (SPMD) programming model in which the programmer provides a single program (or kernel) and identifies the target data with respect to which that program should be executed. Furthermore, as will be explained in more detail with reference to the subsequent figures, the programmer identifies how the input data should be processed by specifying a reference domain. In the context of the GPU 12 in FIG. 1, this reference domain may for example be a two-dimensional reference domain corresponding in size to the dimensions of an image frame to be processed by the GPU.

The GPU 12 comprises two cores 20 and 22 each of which is configured to execute multiple threads in parallel. To administer the allocation of data processing tasks to the threads within each core, each core is provided with a thread dispatcher 24, 26 respectively. The higher level sub-division of data processing tasks between the two cores is administered by the job manager 28. As will be discussed in more detail with reference to the following figures, the GPU 12 is arranged such that the order that the points in the reference domain specified by the programmer are allocated to individual threads being executed on cores 20 and 22 can be varied. This variation may come about as a result of the GPU acting independently or may (alternatively or in addition) come about as a result of explicit programmer choice.

Within each core 20, 22, this variation of the order in which points in the reference domain are allocated to threads can be effected by the respective thread dispatchers 24, 26. However, it should be appreciated that the job manager 28 can also play a role in the configuration of this ordering, by virtue of the job allocation which it performs. For example, where the points in the reference domain are gathered together into a number of groups, the job manager 28 can affect the order in which those groups of points are processed by allocating groups of points as jobs to the cores.

Each processor core 20, 22 has an associated level 1 (L1) cache 30, 32, and each cache has a pending transaction queue 34, 36. The cores share a level 2 (L2) cache 38, which itself has its own pending transaction queue 40. As will be familiar to those of ordinary skill in the art, the L1 caches 30, 32 and L2 cache 38 are provided such that each processor core 20, 22 does not experience the full memory latency associated with retrieving data values from the memory 16 via the system bus 18 every time a given data value is accessed. One of ordinary skill in the art will be similarly familiar with the provision of the pending transaction queues 34, 36, 40 in each of the illustrated caches, in which an entry is made for each transaction which has been requested from that cache level but has not yet completed. As will be discussed in more detail with reference to the following figures, the size of the caches 30, 32, 38 and their respective pending transaction queues 34, 36, 40 represent architectural parameters of the data processing apparatus 10 which may be taken into consideration when determining how the order in which points in the referenced domain are allocated to threads for execution should be configured.

The GPU 12 is further provided with a performance optimiser unit 42 which monitors the performance of the GPU 12 as a whole and the performance of its specific components (receiving this information from performance monitor 43), and on the basis of performance feedback information is configured to, where required, signal to the job manager 28 or the thread dispatchers 24, 26 that the order should be amended in order to improve system performance. The performance monitor 43 is configured to receive performance information from throughout the GPU 12, as required for the particular determinations being performed by the performance optimiser 42. The performance optimiser 42 can be configured to optimise performance according to different metrics. One metric is the data processing time, i.e. the time taken for a particular set of operations to carried out. Another metric is the data processing energy consumption, i.e. the (estimated) energy consumed by the GPU 12 when performing a predetermined data processing task. The energy consumption could for example be estimated by counting high-energy operations such as floating point add/multiply, instruction fetches and data moves between L1, L2 and memory. By assigning a nominal energy cost to each operation it is possible to estimate the total energy used. In addition, the static energy used can be determined by measuring the number of active cycles for each unit and having a nominal energy cost per cycle (=power) for each unit. These determinations are carried out in the performance monitor 43. Alternatively the performance monitor 43 may be configured to contain explicit circuitry to measure the energy used directly.

Figure 2:
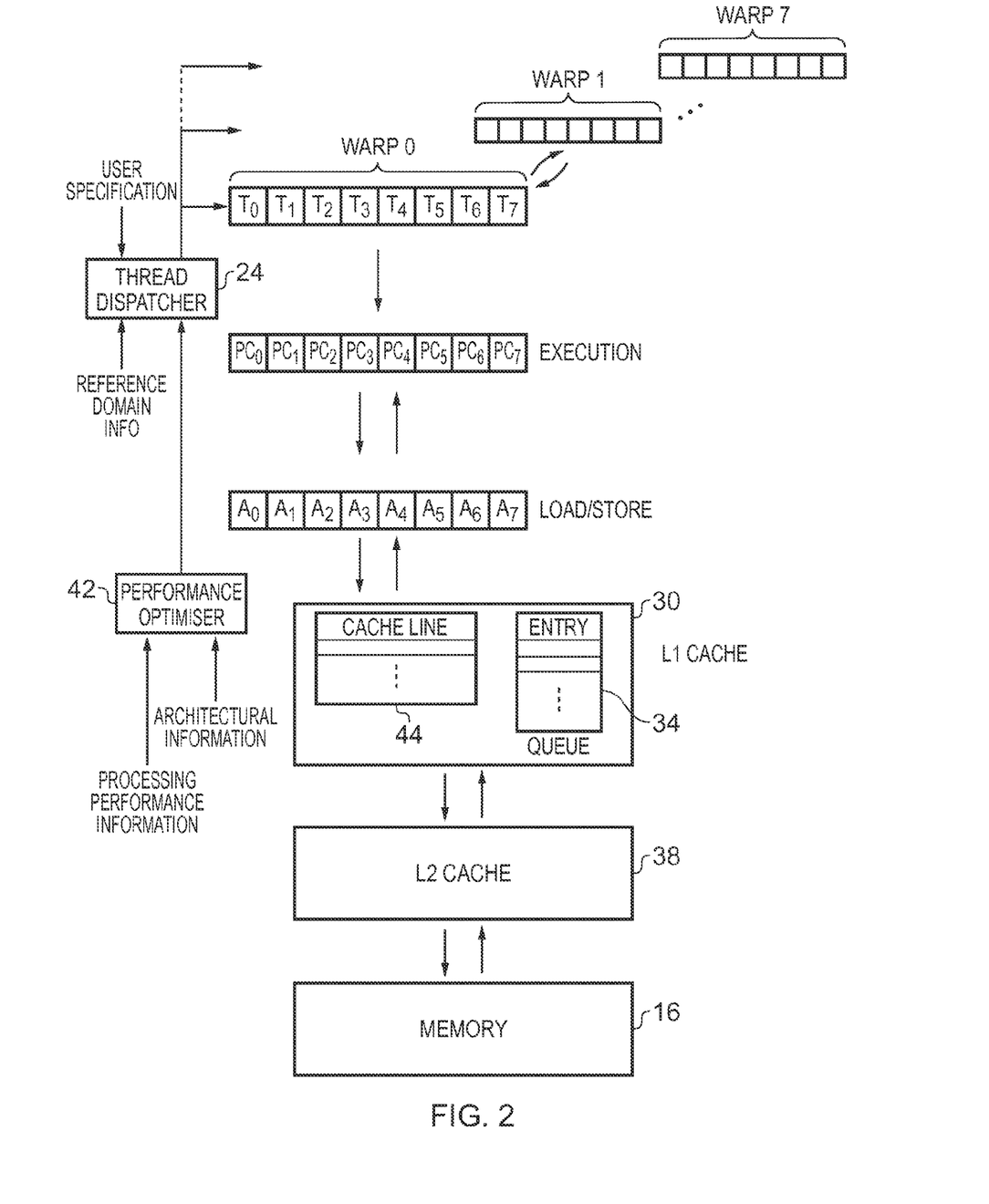
FIG. 2 schematically illustrates the allocation of data processing tasks to threads in a warp-based execution unit in one embodiment, together with a performance optimiser configured to vary the allocation of data processing tasks to those threads.

FIG. 2 schematically illustrates more detail of the manner in which the thread dispatcher in one of the cores shown in GPU 12 in FIG. 1 operates, and more detail of the parallel execution of multiple threads. The example of core 20 is taken here and accordingly thread dispatcher 24, L1 cache 30 and its pending transaction queue 34 are thus shown. The performance optimiser 42, L2 cache 38 and memory 16 of FIG. 1 are also illustrated again in FIG. 2. As can be seen from the top of FIG. 2, core 20 is in fact not only configured to perform parallel thread execution, but moreover is a warp-based execution unit configured to execute 8 threads T0-T7 as one warp, and is configured to maintain 8 warps (shown as warp 0-warp 7) of threads. The thread dispatcher 24 allocates the threads to the warps and data processing tasks to each thread. This is done in part with to respect to reference domain information defining the reference domain which should be used to determine the input data for the data processing carried out by each thread, and in part based on user specification (this being in the form of dedicated program instructions (executed by the thread dispatcher 24/job manager 28) which allow the user to specify certain aspects of the how the order that points in the reference domain are allocated to threads for processing should be configured). In addition, the thread dispatcher 24 is responsive to input from the performance optimiser 42 which itself receives architectural information about the configuration of the data processing device as one input and processing performance information about current or previous data processing performance as another input.

As illustrated in FIG. 2 the core 20 is currently executing warp 0, comprising threads T0-T7. Thus, in the execution stage each thread has an associated program counter value PC (i.e. PC0-PC7). Ideally, threads T0-T7 operate fully in parallel with one another (i.e. without divergence) and will then all operate with respect to the same program counter value PC. One particular benefit of being at the same program counter value PC is that in the load/store stage the memory addresses A0-A7 which this set of 8 threads seeks to access will be closely aligned. In some instances these could indeed be the same memory address, or they may for example only be small increments with respect to one another, meaning that for example a single cache line may cover several if not all, of the required data values. As a warp-based execution unit, the core 20 is provided with mechanisms to identify when the addressed A0-A7 are closely related to one another and to optimise (for example to group together) the resulting memory transactions accordingly.

In the context of the processing arrangements schematically illustrated in FIG. 2, the present techniques recognise that performance advantages may be gained by targeted choices being made in respect to the order with which the thread dispatcher 24 allocates points in the reference domain to the threads for data processing. This then enables the architectural components of the data processing apparatus to be used more efficiently (for example by benefiting from cache locality), but without this efficiency being won at the expense of the executing threads having to use valuable data processing capability to perform a non-sequential memory address calculation.

One example of performance improvement which can be gained is if the memory addressed A0-A7 at the load/store stage are closely correlated, and the ordering of allocation of points of the reference domain chosen by the thread dispatcher 24 can be made to support this. Conversely a preferred performance advantage may in fact result if this memory address correlation is intentionally broken up (at least to a certain extent). This can be understood with reference to the pending transaction queue 34, in which entries are made with respect to each memory transaction, i.e. where a memory transaction initiated by the core 20 has been unable to complete with respect to the data values currently held in the cache lines 44 of the L1 cache 30 and the required data is currently being retrieved, either from L2 cache 38 or further from the memory 16. In order to hide the memory latency associated with retrieval from the L2 cache 38, or more significantly from the memory 16, it is advantageous if the pending transaction queue 34 remains relatively full. One way of achieving this is to vary the order with which points in the reference domain are allocated to threads for the processing by the thread dispatcher 24, such that the correlation between the memory addresses A0-A7 at the load/store stage is weakened and therefore more independent memory transactions are required. It should be recognised that the same principle with respect to the population of the pending transaction queue applies equally to the other L1 cache 36, or indeed to the L2 cache 40.

Another architectural feature of the components shown in FIG. 2 which may be taken into account when determining the order in which the thread dispatcher 24 allocates points in the reference domain to the threads for data processing is the configurational sizes of the caches. For example, the size of each individual cache line 44 and the number of those cache lines which can be held by the L1 cache 30 can be a significant factor. In order to ensure that the L1 cache 30 is efficiently used, the order in which the thread dispatcher 24 allocates points in the reference domain to the threads for data processing can be correspondingly adjusted.

Figure 3:
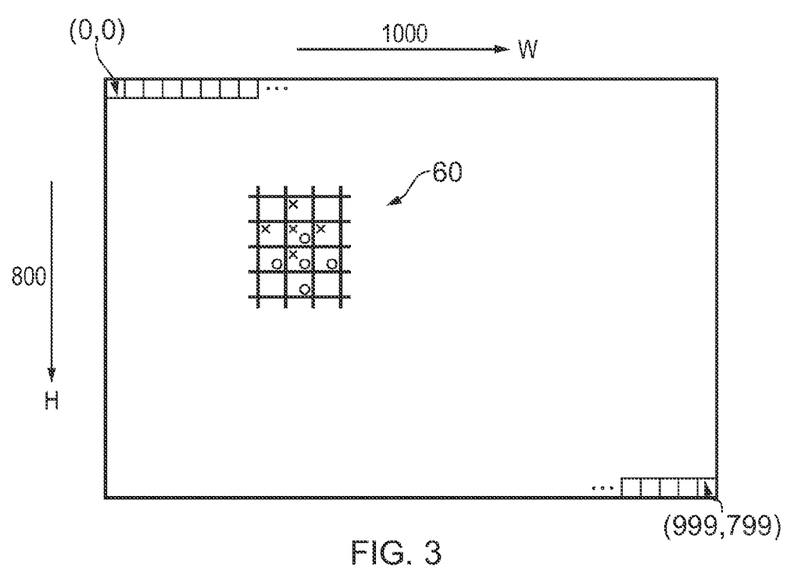
FIG. 3 schematically illustrates a reference domain corresponding to the dimensions of a frame of image data.

FIG. 3 schematically illustrates a reference domain which may be employed according to the present techniques. As can be seen from the figure, in this instance the reference domain is a two-dimensional reference domain and in particular, comprises 1000×800 points. This two-dimensional set of points corresponds in this instance in a one-to-one relationship with a frame of image data (i.e. the frame comprises 1000×800 pixels), however it should be noted that this one-to-one relationship is not essential, and may vary in dependence on the processing being performed. For example, a reference domain with fewer reference points than there are pixels can be envisaged, such as when less than all pixels required processing (e.g. only alternate pixels should be processed). Alternatively, a reference domain with more reference points than there are pixels can also be envisaged, and could even have an additional dimensional, say, such as when more than one processing step should occur with regards to each pixel and the additional dimensional gives a set of reference points corresponding to each processing step for each pixel. The highlighted set of pixels 60 shown in FIG. 3 gives an example of when it may be advantageous not to process the pixels in raster scan order. In this example the particular processing being performed with respect to each pixel location requires a comparison to be made to the pixel locations which are immediately (up/down/left/right) adjacent. Accordingly two example sets of pixel locations which are accessed in two different processing steps as shown, the first being indicated by the cross-shaped set of "x"s and the second being indicated by the cross-shaped set of "o"s. The spatial spread of each of these sets, and the overlap between them, illustrates why a block-wise approach to the ordering with which the points of reference domain (and thus in this example the pixels in the frame) is preferable over a raster scan ordering, because the improved cache usage which results.

Figure 4A:
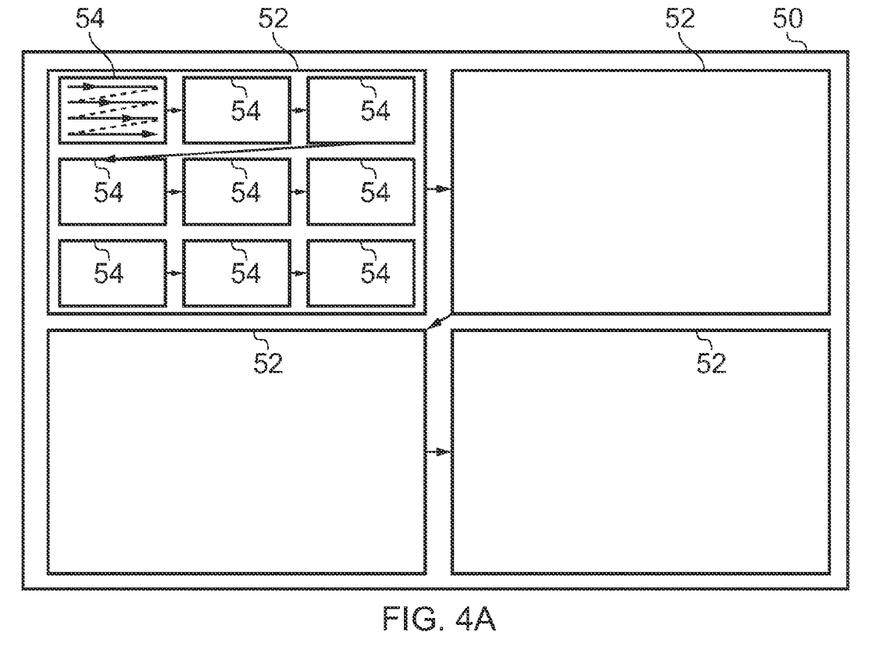
FIG. 4A schematically illustrates the sub-division of a reference domain into a hierarchy of sub-domains.

FIG. 4A schematically illustrates an example of a two-dimensional reference domain 50. Furthermore, FIG. 4A shows an example of how the order in which points within this reference domain are allocated for processing can deviate from a simple sequential, raster scan ordering. The rectangles in FIG. 3 illustrates how the reference domain 50 has been sub-divided into a hierarchy of levels of smaller rectangles, with a hierarchically higher level of four rectangles 52 each themselves being sub-divided into a hierarchically lower level of nine rectangles 54. The arrows in FIG. 4A illustrate that the points within each rectangle 54 are taken in a raster scan order, and the rectangles 54 are themselves handled in a raster scan order, and finally the rectangles 52 are themselves also handled in a raster scan order.

A particular feature of the present techniques is that not only are the sizes of the (sub-)rectangles in FIG. 4A configurable by the user, but the number of levels in the hierarchy of rectangles is similarly configurable. Furthermore, whilst the user may choose to fully specify the order in which the points of the reference domain are allocated at all levels of the hierarchy, it is also possible for the user to select one or more levels of the hierarchy at which to specify the ordering, whilst leaving the ordering at the remaining levels to be determined by the data processing apparatus itself.

Figure 4B:
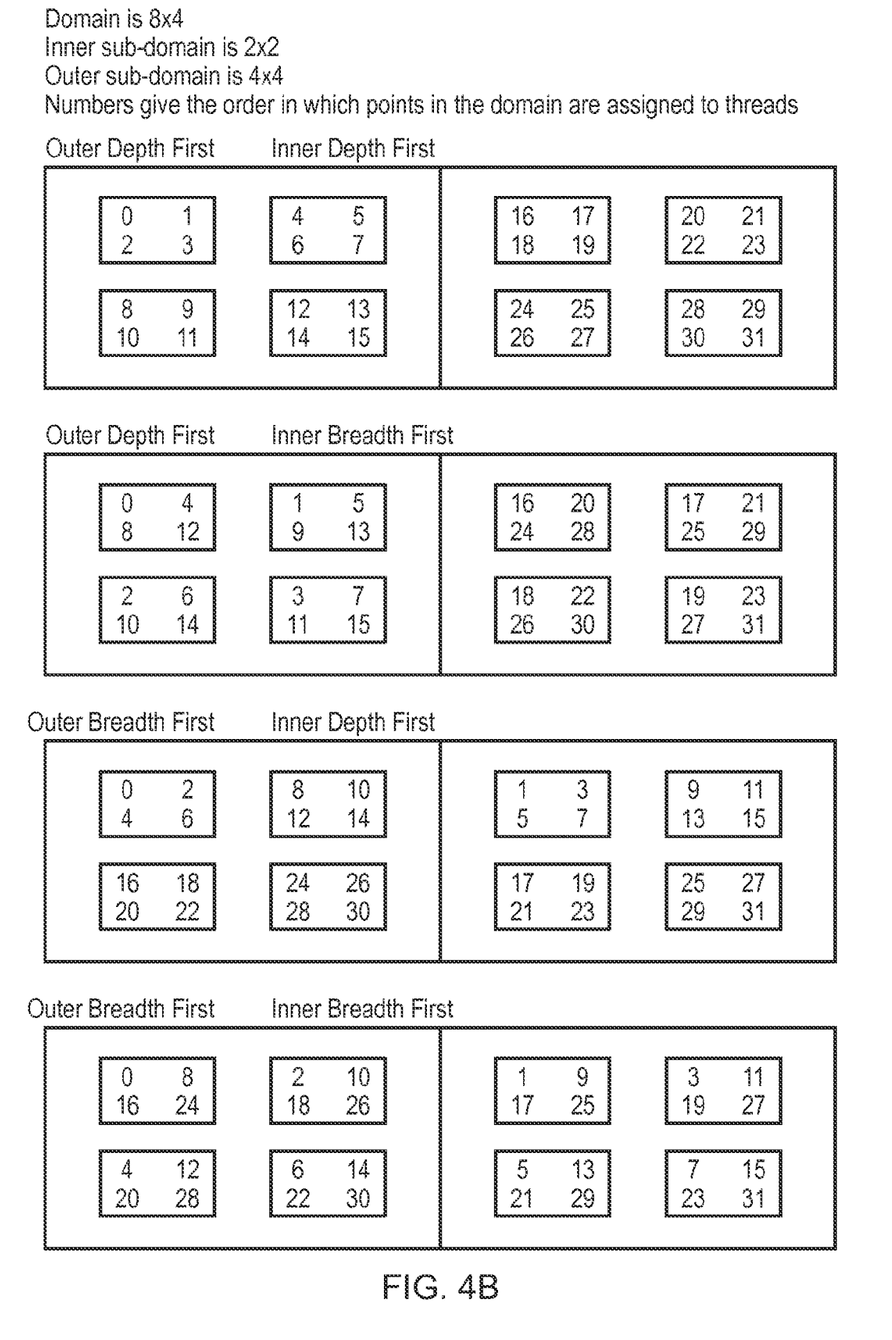
FIG. 4B schematically illustrates the sub-division of a reference domain into a hierarchy of sub-domains and different choices of ordering with respect to those sub-domains.

FIG. 4B schematically illustrates how different choices may be made with respect to each level of a hierarchically sub-divided reference domain. For simplicity of illustration the reference domain is limited here to a two-dimensional 8×4 domain (i.e. having 32 points for allocation). The reference domain has been sub-divided into a hierarchy comprising an "outer" 4×4 sub-domain and an "inner" 2×2 sub-domain. At each level of the hierarchy the system user can specify whether a "depth first" or a "breadth first" approach should be taken. The resulting four different permutations of resulting allocation ordering are shown. Note that it is not necessary for the user to explicitly specify the ordering for each level, and the system may be configured to default to, say, a depth first ordering for a given level of the hierarchy if it has not been user-specified, or for the system to select an appropriate ordering based on the characteristics of the particular apparatus.

Figure 5A:
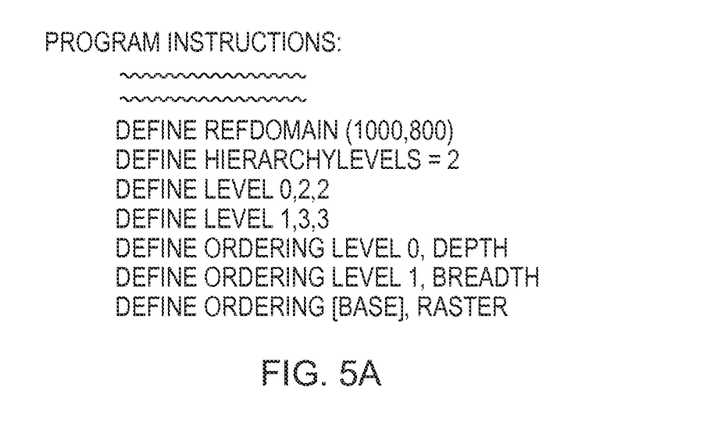
FIGS. 5A-5C show example program instructions which may be used to configure the operation of the data processing apparatus in one embodiment.
Figure 5B:
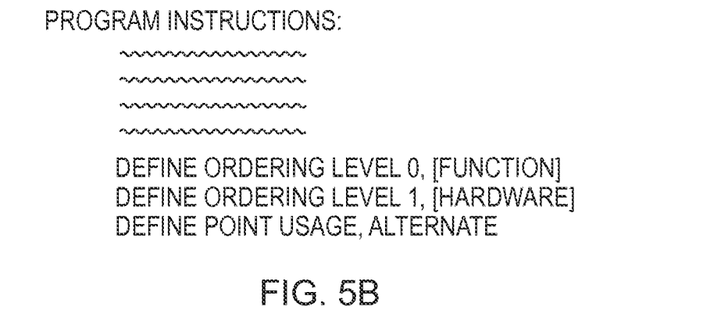
Figure 5C:
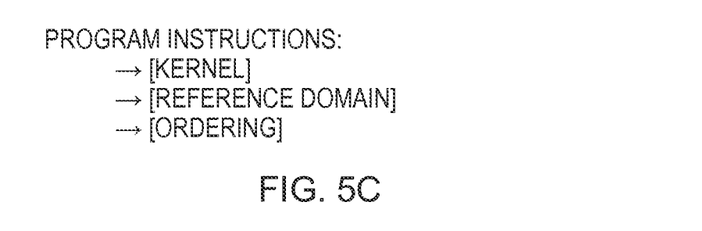

FIGS. 5A-5C schematically illustrate example program instructions which may be used to configure the data processing apparatus in one embodiment. These therefore represent program instructions which are executed by the data processing apparatus in an initial setup phase, before the main data processing begins. The sequence of program instructions shown in FIG. 5A correspond to the processing configuration schematically shown in FIG. 4A. Accordingly, the first instruction "DEFINE REF DOMAIN (1000, 800)" defines the dimensions of the reference domain to be used. The second instruction "DEFINE HIERARCHYLEVELS=2" sets up the number of levels of the hierarchy. The third and fourth instructions "DEFINE LEVEL" set up the configuration of each level, i.e. in this example being a 2×2 and 3×3 set of rectangles respectively. The fifth and sixth instructions "DEFINE ORDERING LEVEL [x]", allows the programmer to explicitly define the order in which the rectangles at each level of the hierarchy should be handled, in this case in depth-first and breadth-first order respectively. The seventh instruction "DEFINE ORDERING LEVEL [BASE]", allows the programmer to explicitly define the order in which the rectangles at the base level of the hierarchy should be handled, e.g. within each rectangle 54 in FIG. 4A, which in this case is explicitly defined as raster scan order. FIG. 5B shows an alternative manner in which the program instructions can be used to specify the ordering in which the reference domain points should be handled by the data processing apparatus. The first instruction "DEFINE ORDERING LEVEL 0, [FUNCTION]", allows the programmer to explicitly define, for a particular level of the hierarchy, a function to be used to determine the order in which points are allocated to threads as a function of the thread number. Further examples of such functions are described below with reference to FIGS. 6A-6C. The second instruction "DEFINE ORDERING LEVEL 0, [HARDWARE]", allows the programmer to explicitly define a level of the hierarchy at which the order in which points are allocated threads should be determined by the hardware, i.e. by the data processing apparatus. Referring to FIG. 1, this selection within the hardware will then be carried out by job manager 28 and/or thread dispatchers 24,26. The third instruction "DEFINE POINT USAGE, ALTERNATE" allows the programmer to specify a subset of points in the reference domain which should actually be allocated to threads for processing. In this example only alternate points (e.g. in a checkerboard fashion) should be processed. Alternatively the user may explicitly specify "DEFINE POINT USAGE, ALL" to indicate that all points should be allocated, although this is also the default behaviour of the system. As another alternative the user may explicitly specify "DEFINE POINT USAGE, FUNCTION" to indicate that all points should be allocated which satisfy the specified function "FUNCTION", which could for example define a geometric sub-space (e.g. a circle) within the reference domain.

Finally FIG. 5C presents a high-level view of the information which the programmer provides to the data processing apparatus before it begins its data processing operations. In particular, the three components provided are: a kernel; a reference domain definition; and an (at least partial) ordering definition.

Figure 6A:
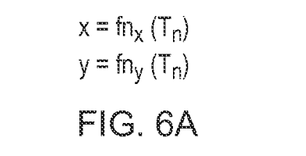
FIG. 6A-6C illustrate some functions which may be provided to convert thread numbers into point co-ordinates in a reference domain.
Figure 6B:
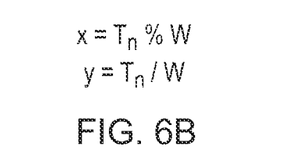
Figure 6C:
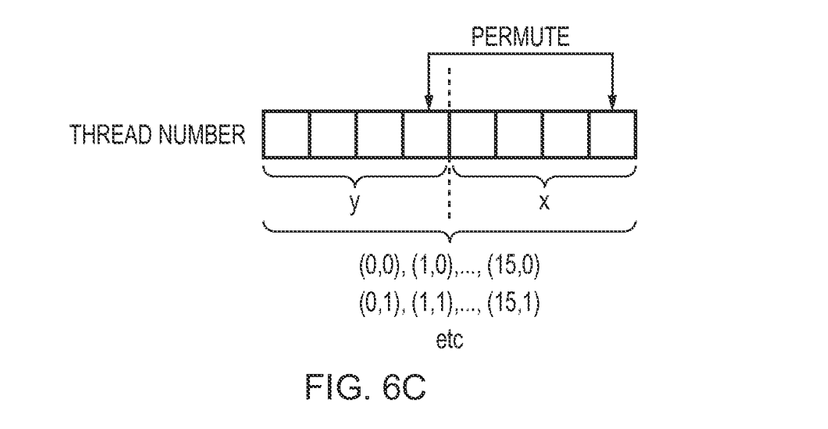

FIGS. 6A-6C illustrate some functions by which points within a reference domain maybe selected on the basis of a given thread number ($T_n$). FIG. 6A illustrates that separate functions $fn_x$ and $fn_y$ may be provided to determine each coordinate (x,y) in a two-dimensional reference frame. FIG. 6B illustrates that the width W of a two-dimensional reference frame may be used to calculate x and y coordinates in combination with the thread number $T_n$. FIG. 6C illustrates a function in which an 8-bit thread number can provide each coordinate (x,y) in a two-dimensional reference frame, wherein the four most significant bits provide the y coordinate and the four least significant bits provide the x coordinate, and wherein the function is configured to permute (i.e. swap) the least significant bits of the x and y coordinates. The resulting reference point ordering is shown.

Figure 7:
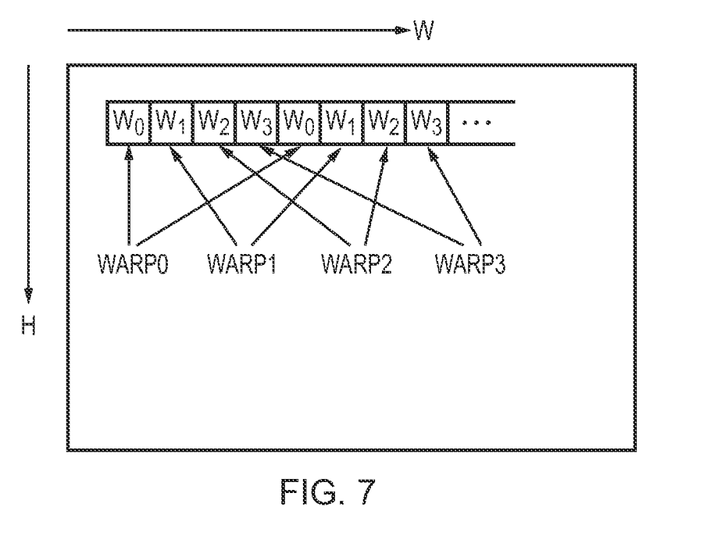
FIG. 7 schematically illustrates one configuration of the order in which points in a reference domain may be allocated to different warps in a warp-based execution unit in one embodiment.

FIG. 7 schematically illustrates how the configuration of the order in which points in a reference domain allocated to threads for data processing can be linked to the warp structure of the data processing apparatus. In particular, as shown in the figure the ordering has been configured such that when considering a row of points in the reference domain the warps to which the allocated threads belong are interleaved. This means that each warp accesses a larger spread of memory, and causes more entries to be added to the load queue in the cache (if not already present). By doing this in the earliest warp the memory operations start sooner and thus latency is reduced.

Figure 8:
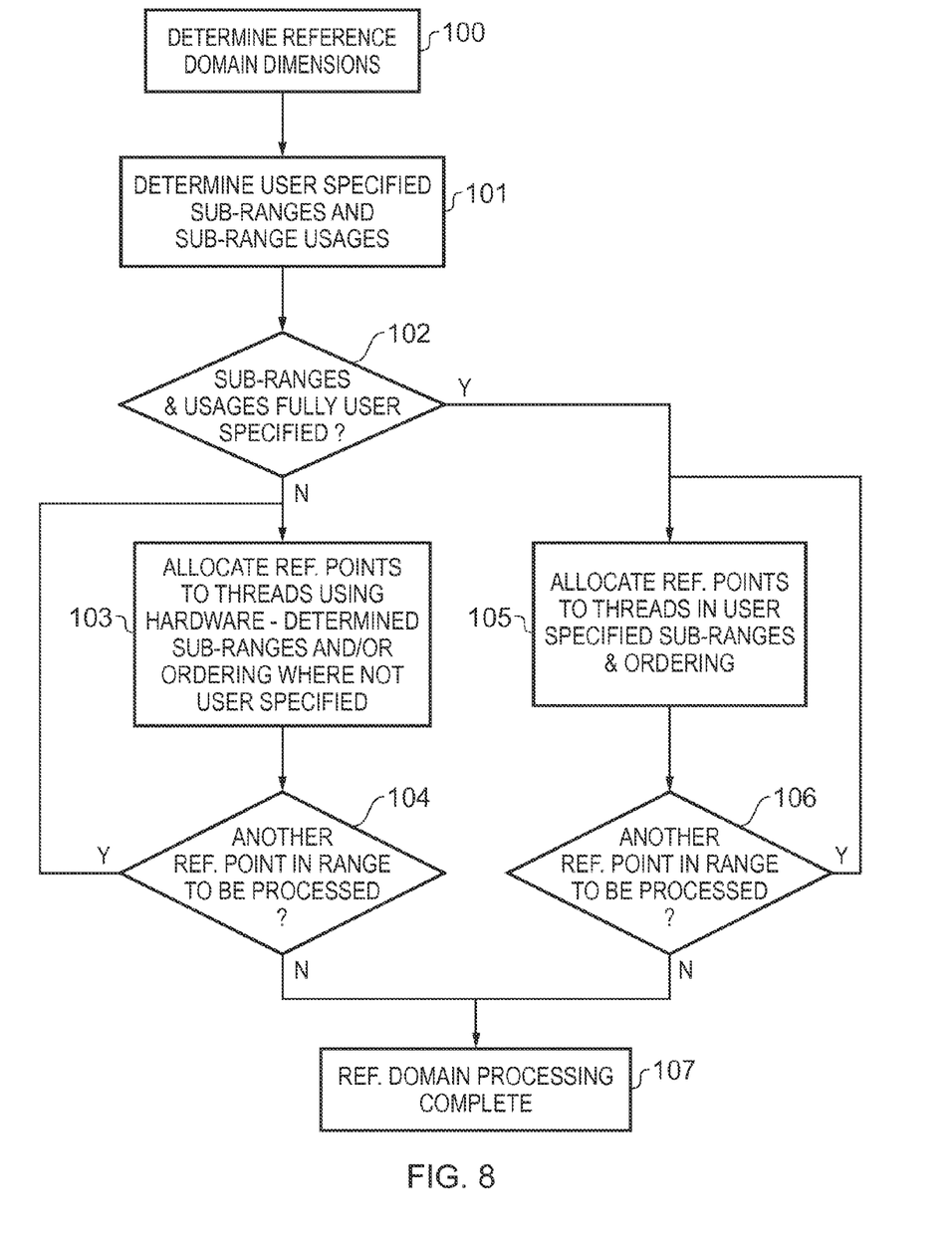
FIG. 8 schematically illustrates a series of steps which may be taken in a method of one embodiment.

FIG. 8 schematically illustrates a sequence of steps which may be taken by the data processing apparatus in one embodiment. The first step 100 determines the dimensions of the reference domain (e.g. from a "DEFINE REFDOMAIN" instruction such as that described with reference to FIG. 5A). The next step 101 determines if any user specified sub ranges/sub range usages have been specified (e.g. from the "DEFINE HIERARCHYLEVELS" etc. instructions such as those described with reference to FIG. 5A). At step 102 it is then determined if the sub ranges within the reference domain have been fully user-specified. If they have then the flow proceeds to step 105 where the points in the reference domain are allocated to threads using the user specified sub ranges and orderings. Whilst there are further points in the reference domain to be allocated (checked at step 106), the flow continues around the step 105/step 106 loop. Once all reference point and reference domain have been processed the processing may be considered complete at step 107. It should however be noted that a typical configuration for the data processing apparatus to process many image frames sequentially and therefore once all points in the reference domain have been used with respect to one image frame, the next step will typically be to reset to the start of the reference frame to begin processing of the next image frame. Returning to step 102, it is determined that the sub ranges and orderings within the reference domain are not fully user specified then the flow proceeds to step 103 where the points in the reference domain allocated threads using any user specified sub ranges and orderings, and allowing the hardware (i.e. typically the job manager and thread dispatch unit(s)) to determine any sub ranges/ orderings where it has the freedom to do so. These may in particular be determined by the hardware such that efficient usage of architectural components of data processing apparatus is made, as described above. Whilst there are further points in the reference domain to be allocated (checked at step 104), the flow continues around the step 103/step 104 loop. Once all reference point in the reference domain have been processed the processing may be considered complete at step 107 (subject to the same caveat mentioned above with respect to processing many image frames sequentially).

Figure 9:
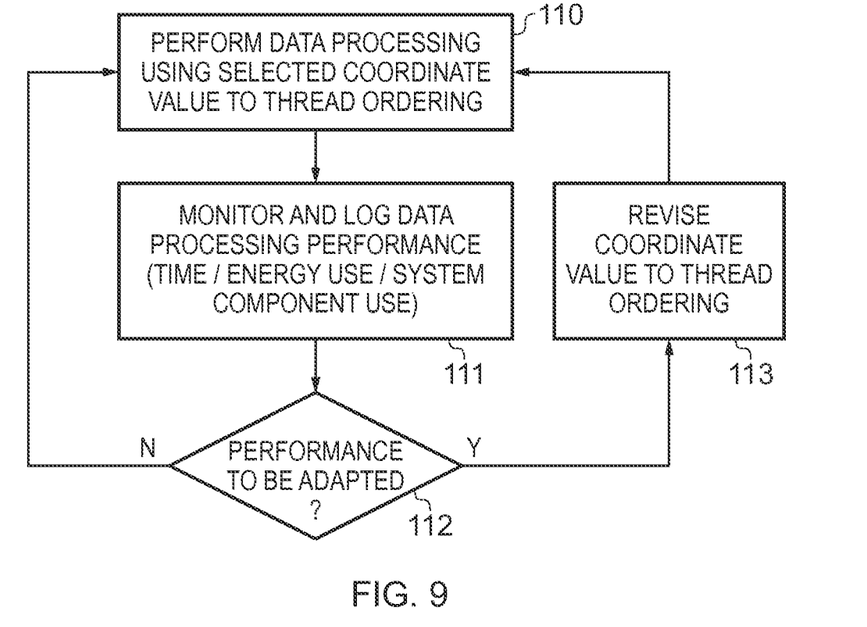
FIG. 9 schematically illustrates a series of steps which are taken in one embodiment to monitor and adapt data processing performance.

FIG. 9 schematically illustrates a sequence of steps which may be taken by the data processing apparatus in one embodiment. These steps are in particular associated with the operation of the performance optimiser 42 shown in FIGS. 1 and 2. At the first step 110 the data processing apparatus performs its data processing using a selected coordinate value to thread ordering (i.e. a current configuration for the allocation of points in the reference domain to threads for data processing). Step 111 shows the performance optimiser 42 monitoring and logging the data processing performance of the data processing apparatus (for example in terms of time spent, estimated energy consumption, or other aspects of system component use). It is then determined at step 112 whether it is desirable for the performance of the data processing apparatus to be adapted, for example because it has been determined that more efficient data processing could be achieved. Taking a frame of image data to be processed as a "job" allocated within the data processing apparatus, the determination performed at step 112 may be performed at the conclusion of the processing of each job (i.e. after each frame has been processed), as it may not be until this stage that meaningful analysis of the performance can be carried out. If an improvement in the performance can be achieved, then at step 113 the configuration which defines the order in which points (coordinates) in the reference domain are allocated to threads for processing is adjusted. Thereafter the flow returns to step 110. It should be noted that this performance adaption could be carried out by either the GPU 12 or the CPU 14 (see FIG. 1) as required.

Figure 10:
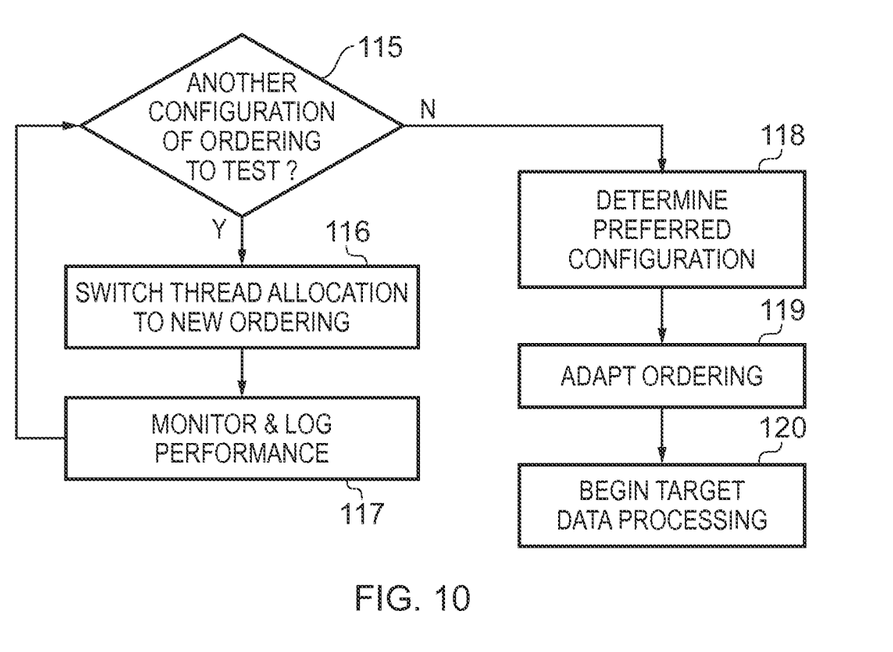
FIG. 10 schematically illustrates a series of steps which are taken in one embodiment when determining a preferred order in which points are allocated to threads for data processing with reference to test configurations.

FIG. 10 schematically illustrates a sequence of steps which may be taken by the data processing apparatus in one embodiment. These steps are in particular associated with an empirical approach to determining an optimal configuration for the order in which the reference domain points are allocated to threads for processing. A number of different configurations are tested out by the method illustrated in FIG. 10 on sample data before the processing of the real target data begins. The flow can be considered to begin at step 115, where a first configuration is tested and at step 116 the data processing apparatus is reconfigured to use this new ordering configuration. On the basis of this configuration the performance of the data processing apparatus is monitored and logged at step 117, until sufficient data have been gathered to evaluate this configuration. The flow then returns to step 115 where it is determined if there is another configuration of the ordering to be tested. Whilst this is true the flow continues around the steps 115/116/117 loop, testing each configuration in turn and gathering performance data for each. Once all configurations have been tested the flow branches to step 118 where the preferred configuration is determined, at step 119 the ordering configuration is adapted accordingly and step 120 the target data processing begins.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A data processing apparatus configured to perform data processing in a single program multiple data fashion, the data processing apparatus comprising:
    execution circuitry configured to execute multiple threads to perform the data processing on data by reference to at least one coordinate value of points in a reference domain; and
    thread allocation circuitry configured to variably specify a selected point in the reference domain for each thread of the multiple threads respectively in order to variably allocate input data for each thread, by variably specifying for each thread the at least one coordinate value of the variably specified point for that thread,
    wherein each thread accesses the input data with reference to its selected point in the reference domain, and
    wherein an order in which points in the reference domain are allocated to threads for data processing is variably configurable in the thread allocation circuitry.

2. The data processing apparatus as claimed in claim 1, comprising a plurality of execution units.

3. The data processing apparatus as claimed in claim 2, further comprising job manager circuitry configured to allocate the data processing between the plurality of execution units, and the thread allocation circuitry is provided by the job manager circuitry.

4. The data processing apparatus as claimed in claim 1, wherein the thread allocation circuitry is provided by thread dispatch circuitry associated with the execution circuitry.

5. The data processing apparatus as claimed in claim 1, wherein the order in which in which points in the reference domain are allocated to threads is configurable at more than one level of granularity.

6. The data processing apparatus as claimed in claim 1, wherein the thread allocation circuitry is configured to sub-divide the reference domain into a plurality of sub-domains and wherein the thread allocation circuitry is configured to allocate all points within a first sub-domain to threads for data processing before allocating points within a second sub-domain to threads, such that the order in which points are allocated to threads is not a raster scan order through the reference domain.

7. The data processing apparatus as claimed in claim 6, wherein the thread allocation circuitry is configured to sub-divide the reference domain into a hierarchy of sub-domains, wherein the hierarchy comprises at least two levels and wherein the thread allocation circuitry is configured to allocate points to threads in an iterative, nested fashion with respect to the hierarchy.

8. The data processing apparatus as claimed in claim 7, wherein the data processing apparatus is configured such that a program instruction executed by the data processing apparatus can specify at least one level of the hierarchy at which the order in which points are allocated to threads is to be determined by the thread allocation circuitry.

9. The data processing apparatus as claimed in claim 7, wherein the data processing apparatus is configured such that a program instruction executed by the data processing apparatus can specify at least partially the order in which points are allocated to threads for at least one level of the hierarchy.

10. The data processing apparatus as claimed in claim 7, wherein the data processing apparatus is configured such that a program instruction executed by the data processing apparatus can specify an order in which the at least two levels of the hierarchy are to be used to allocate points to threads.

11. The data processing apparatus as claimed in claim 1, wherein the data processing apparatus is configured such that a program instruction executed by the data processing apparatus can specify at least partially the order in which points are allocated to threads.

12. The data processing apparatus as claimed in claim 1, wherein the execution circuitry is warp-based execution circuitry and the order in which points are allocated to threads for data processing is configured in dependence on a number of threads in a warp used by the warp-based execution circuitry.

13. The data processing apparatus as claimed in claim 1, further comprising at least one cache storage configured to store temporary copies of data retrieved from memory, wherein the order in which points are allocated to threads is configured in dependence on a size of the cache.

14. The data processing apparatus as claimed in claim 1, further comprising at least one cache storage configured to store temporary copies of data retrieved from memory, wherein the order in which points are allocated to threads is configured in dependence on a re-use distance of the cache.

15. The data processing apparatus as claimed in claim 1, further comprising an outstanding transaction queue configured to hold indications of pending memory transactions resulting from the data processing, wherein the order in which points are allocated to threads is configured in dependence on a size of the outstanding transaction queue.

16. The data processing apparatus as claimed in claim 1, further comprising optimisation circuitry configured to configure the order in which coordinate values are allocated to threads for data processing on the basis of previous data processing performance.

17. The data processing apparatus as claimed in claim 16, wherein the optimisation circuitry is configured to optimise at least one of: data processing time and data processing energy consumption.

18. The data processing apparatus as claimed in claim 1, further comprising optimisation circuitry configured to configure the order in which points are allocated to threads on the basis of at least one architectural parameter of the data processing apparatus.

19. A data processing apparatus configured to perform data processing in a single program multiple data fashion, the data processing apparatus comprising:
  means for executing multiple threads to perform the data processing on data by reference to at least one coordinate value of points in a reference domain; and
  means for variably specifying a selected point in the reference domain for each thread of the multiple threads respectively in order to variably allocate input data for each thread, by variably specifying for each thread the at least one coordinate value of the variably specified point for that thread,
  wherein each thread accesses the input data with reference to its selected point in the reference domain, and
  wherein an order in which points in the reference domain are allocated to threads for data processing is variably configurable in the means for variably specifying.

20. A method of data processing in a single program multiple data fashion, the method of data processing comprising the steps of:
  executing multiple threads to perform the data processing on data by reference to at least one coordinate value of points in a reference domain; and
  variably specifying a selected point in the reference domain for each thread of the multiple threads respectively in order to variably allocate input data for each thread, by variably specifying for each thread the at least one coordinate value of the variably specified point for that thread,
  wherein each thread accesses the input data with reference to its selected point in the reference domain, and
  wherein an order in which points in the reference domain are allocated to threads for data processing is variably configurable in the variably specifying step.

* * * * *